(12) United States Patent
Zhang et al.

(10) Patent No.: US 11,387,491 B2
(45) Date of Patent: Jul. 12, 2022

(54) ELECTROLYTE AND SECONDARY BATTERY CONTAINING THE SAME

(71) Applicant: Ningde Amperex Technology Limited, Fujian (CN)

(72) Inventors: Shuirong Zhang, Fujian (CN); Chao Tang, Fujian (CN); Wenqiang Li, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 277 days.

(21) Appl. No.: 16/162,379

(22) Filed: Oct. 16, 2018

(65) Prior Publication Data
US 2019/0245245 A1 Aug. 8, 2019

(30) Foreign Application Priority Data
Feb. 5, 2018 (CN) .......................... 201810111531.6

(51) Int. Cl.
*H01M 10/0569* (2010.01)
*H01M 10/0525* (2010.01)

(52) U.S. Cl.
CPC ... *H01M 10/0569* (2013.01); *H01M 10/0525* (2013.01); *H01M 2300/0028* (2013.01)

(58) Field of Classification Search
CPC ......... H01M 10/0525; H01M 10/0569; H01M 2300/0028; Y02E 60/10
See application file for complete search history.

(56) References Cited

U.S. PATENT DOCUMENTS

| 8,076,032 B1* | 12/2011 | West | H01M 10/0569 429/313 |
| 2009/0068562 A1* | 3/2009 | Yew | H01M 10/0525 429/231.5 |
| 2012/0082890 A1* | 4/2012 | Dong | H01G 11/58 429/188 |
| 2012/0315549 A1* | 12/2012 | Tang | H01M 6/168 429/331 |
| 2013/0316252 A1* | 11/2013 | Lee | H01M 10/0568 429/332 |
| 2014/0342242 A1* | 11/2014 | Egorov | H01M 10/052 429/332 |
| 2016/0359197 A1* | 12/2016 | Watarai | H01M 4/525 |
| 2017/0018805 A1* | 1/2017 | Yoshida | H01M 10/0567 |
| 2017/0271655 A1* | 9/2017 | Oh | H01M 4/1391 |

FOREIGN PATENT DOCUMENTS

| CN | 104852087 | 8/2015 |
| CN | 105428701 | 3/2016 |
| CN | 107403956 | 11/2017 |
| KR | 20170014889 | 2/2017 |

OTHER PUBLICATIONS

Zhang, Shuirong; Office Action for Chinese Application No. 201810111531.6, filed Feb. 5, 2018, dated Dec. 4, 2020, 4 pages.
Zhang, Shuirong; Office Action for Chinese Application No. 201810111531.6, filed Feb. 5, 2018, dated Jun. 2, 2020, 9 pages.

* cited by examiner

*Primary Examiner* — Sarah A. Slifka
*Assistant Examiner* — Rachel L Zhang
(74) *Attorney, Agent, or Firm* — Taylor English Duma LLP

(57) ABSTRACT

The present application provides an electrolyte and a secondary battery comprising the same. The electrolyte is prepared by adding a siloxane compound, a nitrile compound and an electrolyte salt with different contents into an organic solvent.

12 Claims, No Drawings

ELECTROLYTE AND SECONDARY BATTERY CONTAINING THE SAME

CROSS-REFERENCE TO RELATED APPLICATION

This application claims priority to and benefits of Chinese Patent Application No. 201810111531.6, filed with the State Intellectual Property Office of P. R. China on Feb. 5, 2018, and the entire content of which is incorporated herein by reference.

TECHNICAL FIELD

The present disclosure relates to the field of battery, in particular, to an electrolyte and a secondary battery containing the same.

BACKGROUND

With the technological advancement and market development in the fields of smart phones, consumer drones and electric vehicles, the demand for high-performance batteries is becoming more and more urgent. Secondary batteries, especially for lithium-ion batteries, are still the mainstream battery used in the above fields due to their high energy density, long cycle life, and no memory effect. However, the current market puts more stringent requirements on the performance indicators of lithium-ion batteries, among which high-temperature storage gas production is very important.

Therefore, it is necessary to provide an electrolyte which can effectively improve the high-temperature storage gas production of the battery.

SUMMARY OF THE APPLICATION

In view of the problems in the related art, the present application studies an electrolyte and a secondary battery containing the same, which can significantly reduce the gas production rate of the secondary battery at high temperature storage, improve the cycle performance of the secondary battery, and storage performance at high temperature.

The present application provides an electrolyte, comprising a nitrile compound and a siloxane compound.

In the above electrolyte, the mass percentage of the nitrile compound is 0.5 wt % to 10 wt %, based on the total mass of the electrolyte.

In the above electrolyte, the mass percentage of the siloxane compound is 0.1 wt % to 10 wt %, based on the total mass of the electrolyte.

In the above electrolyte, the nitrile compound is one or more selected from a group consisting of a hydrocarbon comprising 1 to 3 nitrile groups, a hydrocarbon oxygen compound comprising 1 to 3 nitrile groups, a halogenated hydrocarbon comprising 1 to 3 nitrile groups, and a halogenated hydrocarbon oxygen compound containing 1 to 3 nitrile groups.

In the above electrolyte, the nitrile compound is selected from one or more of the compounds represented by formula I:

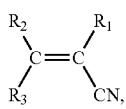

formula I wherein $R_1$, $R_2$ and $R_3$ are each independently selected from a group consisting of H, a nitrile group, an alkyl group comprising 1 to 10 carbon atoms, and a halogenated alkyl group comprising 1 to 10 carbon atoms.

In the above electrolyte, the nitrile compound is selected from one or more of the compounds represented by formula II:

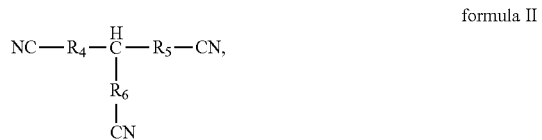

formula II wherein $R_4$, $R_5$ and $R_6$ are each independently selected from a group consisting of an alkylene group comprising 0 to 5 carbon atoms, a halogenated alkylene group comprising 0 to 5 carbon atoms, an alkyleneoxy group comprising 1 to 5 carbon atoms, a halogenated alkyleneoxy group comprising 1 to 5 carbon atoms, an alkyl alkyleneoxy group comprising 1 to 5 carbon atoms and a halogenated alkyl alkyleneoxy group comprising 1 to 5 carbon atoms; the number of carbon atoms of $R_4$, $R_5$ and $R_6$ is not 0 at the same time.

In the above electrolyte, the nitrile compound is selected from one or more of the compounds represented by the following formulas:

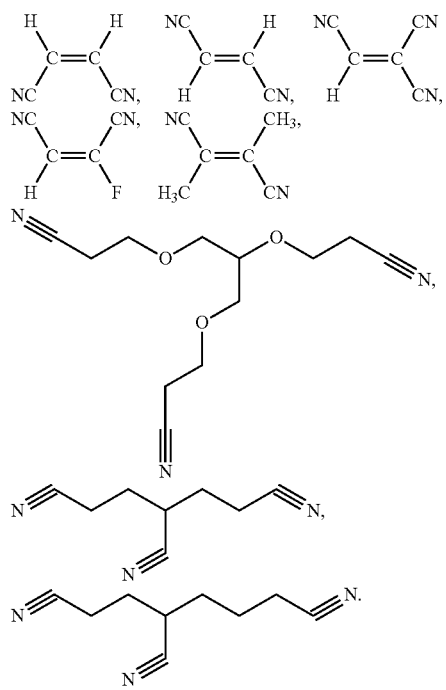

In the above electrolyte, the siloxane is selected from one or more of the compounds represented by the formula III:

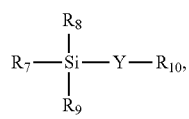

formula III wherein $R_7$, $R_8$ and $R_9$ are each independently selected from a group consisting of F, Cl, Br, I, an alkyl group comprising 1 to 6 carbon atoms, an alkylene group comprising 2 to 6 carbon atoms, and an alkynyl group comprising 2 to 6 carbon atoms;

$R_{10}$ is methyl;

Y is an alkyleneoxy group comprising 1 to 10 carbon atoms.

In the above electrolyte, the siloxane is selected from one or more of the compounds represented by the following formulas:

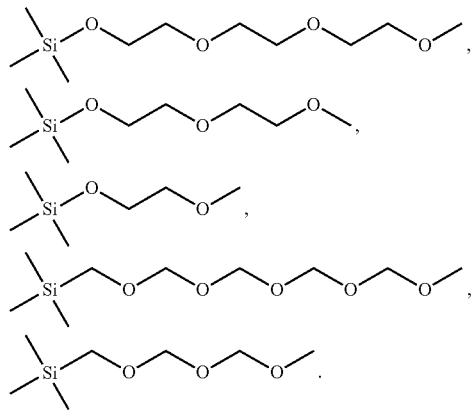

In the above electrolyte, the electrolyte further comprises a lithium salt in which the electrolyte salt has a concentration of 0.5 M to 3 M; the electrolyte salt may also has a concentration of 0.5 M to 1.5 M.

A lithium-ion battery, comprising the above electrolyte.

The electrolyte provided by the present application can significantly reduce the gas production of the battery during high-temperature storage by adding a siloxane compound and a nitrile compound worked synergistically to the electrolyte, and simultaneously improve the cycle performance and high-temperature storage performance of the battery.

DETAILED DESCRIPTION OF THE PREFERRED EXAMPLES

The technical solutions in the examples of the present application will be clearly and completely described hereafter in connection with the examples of the present application. It is apparent that the described examples are only a part of the examples of the present application, but not the whole. Based on the examples of the present application, all the other examples obtained by those of ordinary skill in the art are within the scope of the present application.

According to one aspect of the present application, the present application provides an electrolyte comprising a non-aqueous organic solvent, an electrolyte salt, a nitrile compound and a siloxane compound.

In the electrolyte, the non-aqueous organic solvent is one or more selected from a group consisting of ethylene carbonate, propylene carbonate, butylene carbonate, dimethyl carbonate, ethyl methyl carbonate, diethyl carbonate, dipropyl carbonate, methyl propyl carbonate, ethyl propyl carbonate, 1,4-butyrolactone, methyl propionate, methyl butyrate, ethyl acetate, ethyl propionate, ethyl butyrate.

In the electrolyte, an electrolyte salt is included. The electrolyte salt may be selected from a lithium salt, a sodium salt or a zinc salt, depending on the secondary battery to be applied. Among them, taking a lithium salt as an example, the lithium salt may be selected from one or more of an inorganic lithium salt and an organic lithium salt. The lithium salt is one or more selected from the group consisting of lithium hexafluorophosphate ($LiPF_6$), lithium difluorophosphate ($LiPO_2F_2$), lithium tetrafluoroborate ($LiBF_4$), lithium hexafluoroarsenate, lithium perchlorate, Lithium bis(oxalate)borate (LiBOB), lithium difluorooxalateborate (LiDFOB), Lithium bis(fluorosulfonyl)imide (LiFSI), Lithium bis(trifluoromethylsulphonyl)imide (LiTFSI), wherein the concentration of the lithium salt in the electrolyte is 0.5M to 3M.

In the electrolyte, the lithium salt is at least one selected from the group consisting of lithium hexafluorophosphate ($LiPF_6$) and lithium tetrafluoroborate ($LiBF_4$), wherein the concentration of the lithium salt in the electrolyte is from 0.5 M to 1.5 M.

In the electrolyte, a nitrile compound and a siloxane compound are included, wherein the lone pair electron energy level in the nitrile functional group is close to the energy level of the outermost vacant orbit of the transition metal atom in the cathode active material of the secondary battery, so that the compound containing nitrile functional may be subjected to complex adsorption on the surface of the cathode. The nitrile compound adsorbed on the surface of the cathode may well separate the oxidizable component in the electrolyte from the surface of the cathode, greatly reducing the oxidation of the electrolyte on the surface of the cathode of the secondary battery in the charged state, thereby improving the cycle performance and high-temperature storage performance of the secondary battery. According to above understanding, the nitrile compounds of different structures may have different isolation effects on the electrolyte and the surface of the cathode. As the number of nitrile functional groups in the nitrile compound increases, the isolation effect is more remarkable. At the same time, the size of the organic molecule containing nitrile functional group has an optimal value. If the molecular is too small, the oxidizable component in the electrolyte may not be effectively separated from the surface of the cathode. If the molecular is too large, the oxidizable component in the electrolyte may contact the surface of the cathode through the gap of the compound containing the nitrile functional group, and thus cannot provide a good isolation effect. Preferably, the nitrile compound is one or more selected from a group consisting of a hydrocarbon comprising 1 to 3 nitrile groups, a hydrocarbon oxygen compound comprising 1 to 3 nitrile groups, a halogenated hydrocarbon comprising 1 to 3 nitrile groups, and a halogenated hydrocarbon oxygen compound containing 1 to 3 nitrile groups, and the carbon-carbon double bond facilitates the polymerization of organic molecules. The polymerized nitrile-containing functional group adsorbed on the surface of the cathode may provide better isolation effects than the unpolymerized organic molecules. Among them, the functionalized siloxane compound may remove a trace amount of water in the electrolyte, thereby inhibiting the hydrolysis reaction of lithium hexafluorophosphate. At the same time, the siloxane compound may react with the phosphorus pentafluoride produced by the decomposition of lithium hexafluorophosphate to reduce its catalytic effect on the electrolytic solvent, thereby achieving the purpose of alleviating the high-temperature storage gas production of the secondary battery. By applying the nitrile compound and the siloxane together in the electrolyte, the synergistic action of the two may fully exert the effects of both, and the cycle performance and high-temperature storage performance of the secondary battery may be further improved.

In the electrolyte, the nitrile compound in the additive is one or more selected from a group consisting of compounds represented by the following formula I and formula II, wherein $R_1$, $R_2$ and $R_3$ is one each independently selected from a group consisting of H, a nitrile group, an alkyl group comprising 1 to 10 carbon atoms, and a halogenated alkyl group comprising 1 to 10 carbon atoms; $R_4$, $R_5$ and $R_6$ is one each independently selected from a group consisting of an alkylene group comprising 0 to 5 carbon atoms, a halogenated alkylene group comprising 0 to 5 carbon atoms, an alkyleneoxy group comprising 1 to 5 carbon atoms, a halogenated alkyleneoxy group comprising 1 to 5 carbon atoms, an alkyl alkoxy group comprising 1 to 5 carbon atoms and a halogenated alkyl alkoxy group comprising 1 to 5 carbon atoms; the number of carbon atoms of $R_4$, $R_5$ and $R_6$ is not 0 at the same time.

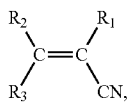
(formula I)

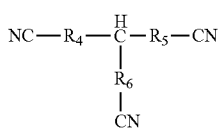
(formula II)

In the electrolyte, the nitrile compound in the additive is one or more selected from a group consisting of the compounds represented by the following formula J-1, formula J-2, formula J-3, formula J-4, formula J-5, formula J-6, formula J-7, formula J-8.

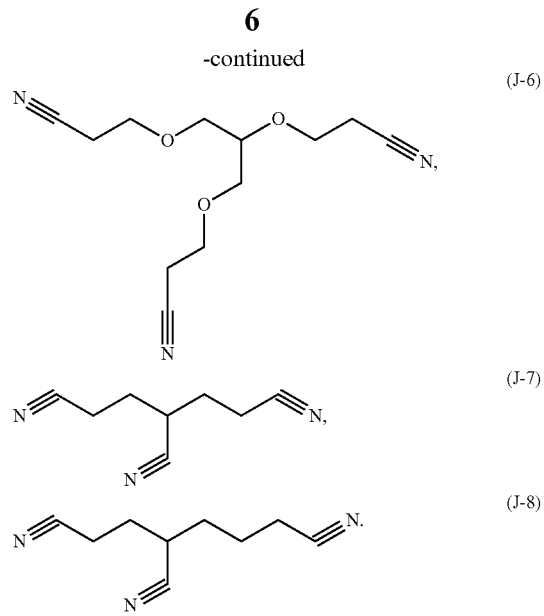

(J-1)

(J-2)

(J-3)

(J-4)

(J-5)

(J-6)

(J-7)

(J-8)

In the electrolyte, the siloxane compound is selected from one or more of the compounds represented by formula III:

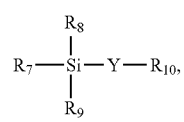
formula III wherein $R_7$, $R_8$ and $R_9$ are each independently selected from a group consisting of F, Cl, Br, I, an alkyl group comprising 1 to 6 carbon atoms, an alkylene group comprising 2 to 6 carbon atoms, and an alkynyl group comprising 2 to 6 carbon atoms;

$R_{10}$ is methyl;

Y is an alkyleneoxy group comprising 1 to 10 carbon atoms.

In the electrolyte, the siloxane compound in the additive is selected from the following formula S-1, formula S-2, formula S-3, formula S-4, and formula S-5:

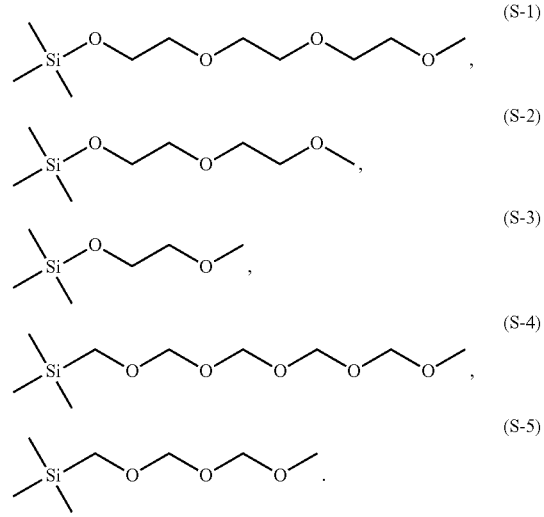

(S-1)

(S-2)

(S-3)

(S-4)

(S-5)

In the electrolyte, the nitrile compound accounts for 0.5 wt % to 10 wt % of the total mass of the electrolyte, wherein when the percentage of the nitrile compound in the total mass of the electrolyte is less than 0.5% by weight, the isolation effect on the surface of the cathode and the oxidizable component in the electrolyte is not obvious, and the cycle performance and high-temperature storage performance of the secondary battery cannot be significant improved; when the mass percentage of the nitrile compound in the non-aqueous electrolyte is higher than 10%, the viscosity and electrical conductivity of the electrolyte are adversely affected, thereby affecting the cycle performance of the secondary battery while the incompatibility of the nitrile compound with the anode being amplified.

In the electrolyte, wherein the mass percentage of the siloxane compound is 0.1 wt % to 10 wt %, based on the total mass of the electrolyte, wherein when the mass percentage of the siloxane compound in the non-aqueous electrolyte is less than 0.1 wt %, the effect on the performance improvement of the lithium-ion battery is not significant; when the mass percentage of the siloxane compound in the non-aqueous electrolyte is higher than 10 wt %, the cycle performance of the lithium-ion battery is affected.

In the electrolyte, the additive further comprises one or more of a cyclic carbonate comprising a carbon-carbon double bond, a fluorocyclic carbonate and a sultone compound.

In the electrolyte, based on the total mass of the electrolyte, the mass percentage of the cyclic carbonate comprising a carbon-carbon double bond is 0.1 wt % to 10 wt %, the mass percentage of the fluorinated cyclic carbonate is from 0.1 wt % to 30 wt %, and the mass percentage of the sultone compound is from 0.1% to 5 wt %.

In the electrolyte, the cyclic carbonate comprising a carbon-carbon double bond is one or more selected from a group consisting of vinylene carbonate (VC), 4-methylvinylene carbonate, and 4-ethylvinylene carbonate; the fluorocyclic carbonate is selected from one or more of fluoroethylene carbonate (FEC), difluoroethylene carbonate, and trifluoromethyl ethylene carbonate.

If an additive such as one or more of ethylene carbonate (VC), fluoroethylene carbonate (FEC) and 1,3-propane sultone (PS) is added, the consumption of the electrolyte at the anode may be reduced while protecting the anode and cathode, which is beneficial to the improvement of circulation.

According to the second aspect of the present application, the present application provides a secondary battery comprising above electrolyte, wherein a positive electrode, a negative electrode, a separator and an electrolyte, and wherein the positive electrode includes a positive current collector, a positive active material, a binder, and a conductive agent, and the negative electrode includes a negative current collector, a negative active material, a binder, and a conductive agent.

In the secondary battery according to the second aspect of the present application, the secondary battery may be a lithium-ion secondary battery, a sodium-ion secondary battery, or a zinc-ion secondary battery.

In the secondary battery according to the second aspect of the present application, the specific type of the positive electrode active material is not particularly limited and may be selected according to requirements. Specifically, the positive active material is one or more selected from a group consisting of lithium cobalt oxide ($LiCoO_2$), lithium nickel manganese cobalt ternary material, lithium iron phosphate ($LiFePO_4$), and lithium manganate ($LiMn_2O_4$).

In the secondary battery according to the second aspect of the present application, the specific type of the negative electrode active material is not particularly limited and may be selected according to requirements. Taking a lithium-ion secondary battery as an example, the negative active material is one or more selected from a group consisting of natural graphite, artificial graphite, mesocarbon microbeads (referred to as MCMB), hard carbon, soft carbon, silicon, silicon-carbon composites, Li—Sn alloy, Li—Sn—O alloy, Sn, SnO, $SnO_2$, lithium $TiO_2$—$Li_4Ti_5O_{12}$ with spinel structure, Li—Al alloy.

The technical solutions of the present application are further described below with reference to the examples, but are not limited thereto. All modifications and equivalents to the technical solutions of the present application are intended to be included within the scope of the present application.

In the following examples and comparative examples, the agents, materials, and instruments used are commercially available or synthetically obtained unless otherwise specified.

Lithium-ion batteries comprising the above electrolyte are prepared in accordance with specific examples, and performance tests are carried out separately, and comparative analysis is carried out in combination with comparative examples.

Comparative Example 1

(1) Preparation of Electrolyte

In a dry argon atmosphere, organic solvent of ethylene carbonate (EC), an ethyl methyl carbonate (EMC) and a diethyl carbonate (DEC) are first mixed in a mass ratio of EC:EMC=DEC=30:50:20, then a FEC in an amount of 3 wt % based on the total mass of the electrolyte is added to the organic solvent, dissolved and uniformly mixed, finally, lithium salt of lithium hexafluorophosphate ($LiPF_6$) is dissolved in a mixed solution of the organic solvent and the additive to obtain an electrolyte with a lithium salt concentration of 1.15M.

(2) Preparation of Positive Electrode

A positive electrode active material of lithium cobalt oxide ($LiCoO_2$), a conductive agent of Super P, and a binder of polyvinylidene fluoride (PVDF) are added in a solvent of N-methylpyrrolidone (NMP) to prepare a positive electrode slurry. The positive electrode slurry is uniformly coated on a current collector of aluminum foil, dried at 85° C., and then pressed, and then trimmed, cut, and stripped, followed by drying under vacuum at 85° C. for 4 h to prepare a positive electrode of the lithium-ion battery.

(3) Preparation of Negative Electrode

A graphite used as the negative active material is uniformly mixed with the conductive agent of Super P, the thickener of carboxymethylcellulose sodium (CMC), and a binder of styrene-butadiene rubber (SBR) in a deionized water to prepare a negative electrode slurry. The negative electrode slurry is coated on a current collector of copper foil and dried at 85° C.; then after trimming, cutting, and stripping, drying is performed under vacuum at 120° C. for 12 h to prepare a negative electrode of the lithium-ion battery.

(4) Preparation of Lithium-Ion Battery

An separator and the prepared positive electrode and the negative electrode are stacked in an order of the positive electrode, the separator and the negative electrode, so that the separator is in the middle of the positive electrode and negative electrode, and then wound up to obtain a battery core; after welding an electrode tab, the battery core is placed in the outer packaging of the aluminum plastic film, and the electrolyte prepared above is injected into a dried lithium-ion battery and followed by packaging, stewing, forming, shaping, and capacity testing to complete the preparation of the lithium-ion battery.

Comparative Example 2

An electrolyte is prepared in the same manner as in Comparative Example 1, except that the electrolyte further includes J-2 in an amount of 1 wt % based on the total mass of the electrolyte.

Comparative Example 3

The preparation is performed in the same manner as in Comparative Example 1, except that the electrolyte further includes J-3 in an amount of 1 wt % based on the total mass of the electrolyte.

Comparative Example 4

The preparation is performed in the same manner as in Comparative Example 1, except that the electrolyte further includes J-6 in an amount of 1 wt % based on the total mass of the electrolyte.

Comparative Example 5

The preparation is performed in the same manner as in Comparative Example 1, except that the electrolyte further includes J-8 in an amount of 1 wt % based on the total mass of the electrolyte.

Comparative Example 6

The preparation is performed in the same manner as in Comparative Example 1, except that the electrolyte further includes J-2 in an amount of 1 wt % and J-6 in an amount of 1 wt % based on the total mass of the electrolyte.

Comparative Example 7

The preparation is performed in the same manner as in Comparative Example 1, except that the electrolyte further includes J-2 in an amount of 1 wt % and the J-8 in an amount of 1 wt % based on the total mass of the electrolyte.

Comparative Example 8

The preparation is performed in the same manner as in Comparative Example 1, except that the electrolyte further includes J-3 in an amount of 1 wt % and J-6 in an amount of 1 wt % based on the total mass of the electrolyte.

Comparative Example 9

The preparation is performed in the same manner as in Comparative Example 1, except that the electrolyte further includes J-3 in an amount of 1 wt % and J-8 in an amount of 1 wt % based on the total mass of the electrolyte.

Comparative Example 10

The preparation is performed in the same manner as in Comparative Example 1, except that the electrolyte further includes J-8 in an amount of 0.01 wt % and S-1 in an amount of 1 wt % based on the total mass of the electrolyte.

Comparative Example 11

The preparation is performed in the same manner as in Comparative Example 1, except that the electrolyte further includes J-8 in an amount of 35 wt % and S-1 in an amount of 1 wt % based on the total mass of the electrolyte.

Comparative Example 12

The preparation is performed in the same manner as in Comparative Example 1, except that the electrolyte further includes S-1 in an amount of 1 wt % based on the total mass of the electrolyte.

Comparative Example 13

The preparation is performed in the same manner as in Comparative Example 1, except that the electrolyte further includes S-2 in an amount of 1 wt % based on the total mass of the electrolyte.

Comparative Example 14

The preparation is performed in the same manner as in Comparative Example 1, except that the electrolyte further includes J-8 in an amount of 1 wt % and S-1 in an amount of 0.01 wt % based on the total mass of the electrolyte.

Comparative Example 15

The preparation is performed in the same manner as in Comparative Example 1, except that the electrolyte further includes J-8 in an amount of 1 wt % and S-1 in an amount of 15 wt % based on the total mass of the electrolyte.

Comparative Example 16

The preparation is performed in the same manner as in Comparative Example 1, except that the electrolyte does not contain FEC but contains PS in an amount of 1 wt % and S-1 in an amount of 1 wt % based on the total mass of the electrolyte.

Example 1

The preparation is performed in the same manner as in Comparative Example 1, except that the electrolyte further includes J-2 in an amount of 1 wt % and S-1 in an amount of 1 wt % based on the total mass of the electrolyte.

Example 2

The preparation is performed in the same manner as in Comparative Example 1, except that the electrolyte further includes J-2 in an amount of 1 wt % and S-2 in an amount of 1 wt % based on the total mass of the electrolyte.

Example 3

The preparation is performed in the same manner as in Comparative Example 1, except that the electrolyte further includes J-3 in an amount of 1 wt % and S-1 in an amount of 1 wt % based on the total mass of the electrolyte.

Example 4

The preparation is performed in the same manner as in Comparative Example 1, except that the electrolyte further includes J-3 in an amount of 1 wt % and S-2 in an amount of 1 wt % based on the total mass of the electrolyte.

Example 5

The preparation is performed in the same manner as in Comparative Example 1, except that the electrolyte further includes J-6 in an amount of 1 wt % and S-1 in an amount of 1 wt % based on the total mass of the electrolyte.

Example 6

The preparation is performed in the same manner as in Comparative Example 1, except that the electrolyte further includes J-6 in an amount of 1 wt % and S-2 in an amount of 1 wt % based on the total mass of the electrolyte.

Example 7

The preparation is performed in the same manner as in Comparative Example 1, except that the electrolyte further includes J-8 in an amount of 1 wt % and S-1 in an amount of 1 wt % based on the total mass of the electrolyte.

Example 8

The preparation is performed in the same manner as in Comparative Example 1, except that the electrolyte further includes J-8 in an amount of 1 wt % and S-2 in an amount of 1 wt % based on the total mass of the electrolyte.

Example 9

The preparation is performed in the same manner as in Comparative Example 1, except that the electrolyte further includes J-2 in an amount of 1 wt %, J-6 in an amount of 1 wt % and S-1 in an amount of 1 wt % based on the total mass of the electrolyte.

Example 10

The preparation is performed in the same manner as in Comparative Example 1, except that the electrolyte further includes J-2 in an amount of 1 wt %, J-6 in an amount of 1 wt % and S-2 in an amount of 1 wt % based on the total mass of the electrolyte.

Example 11

The preparation is performed in the same manner as in Comparative Example 1, except that the electrolyte further includes J-2 in an amount of 1 wt %, J-8 in an amount of 1 wt % and S-1 in an amount of 1 wt % based on the total mass of the electrolyte.

Example 12

The preparation is performed in the same manner as in Comparative Example 1, except that the electrolyte further includes J-2 in an amount of 1 wt %, J-8 in an amount of 1 wt % and S-2 in an amount of 1 wt % based on the total mass of the electrolyte.

Example 13

The preparation is performed in the same manner as in Comparative Example 1, except that the electrolyte further includes J-3 in an amount of 1 wt %, J-6 in an amount of 1 wt % and S-1 in an amount of 1 wt % based on the total mass of the electrolyte.

Example 14

The preparation is performed in the same manner as in Comparative Example 1, except that the electrolyte further includes J-3 in an amount of 1 wt %, J-6 in an amount of 1 wt % and S-2 in an amount of 1 wt % based on the total mass of the electrolyte.

Example 15

The preparation is performed in the same manner as in Comparative Example 1, except that the electrolyte further includes J-3 in an amount of 1 wt %, J-8 in an amount of 1 wt % and S-1 in an amount of 1 wt % based on the total mass of the electrolyte.

Example 16

The preparation is performed in the same manner as in Comparative Example 1, except that the electrolyte further includes J-3 in an amount of 1 wt %, J-8 in an amount of 1 wt % and S-2 in an amount of 1 wt % based on the total mass of the electrolyte.

Example 17

The preparation is performed in the same manner as in Comparative Example 1, except that the electrolyte further includes J-8 in an amount of 0.5 wt % and S-1 in an amount of 1 wt % based on the total mass of the electrolyte.

Example 18

The preparation is performed in the same manner as in Comparative Example 1, except that the electrolyte further includes J-8 in an amount of 2 wt % and S-1 in an amount of 1 wt % based on the total mass of the electrolyte.

Example 19

The preparation is performed in the same manner as in Comparative Example 1, except that the electrolyte further includes J-8 in an amount of 5 wt % and S-1 in an amount of 1 wt % based on the total mass of the electrolyte.

Example 20

The preparation is performed in the same manner as in Comparative Example 1, except that the electrolyte further includes J-8 in an amount of 10 wt % and S-1 in an amount of 1 wt % based on the total mass of the electrolyte.

Example 21

The preparation is performed in the same manner as in Comparative Example 1, except that the electrolyte further includes J-8 in an amount of 1 wt % and S-1 in an amount of 0.1 wt % based on the total mass of the electrolyte.

Example 22

The preparation is performed in the same manner as in Comparative Example 1, except that the electrolyte further includes J-8 in an amount of 1 wt % and S-1 in an amount of 0.2 wt % based on the total mass of the electrolyte.

Example 23

The preparation is performed in the same manner as in Comparative Example 1, except that the electrolyte further includes J-8 in an amount of 1 wt % and S-1 in an amount of 0.5 wt % based on the total mass of the electrolyte.

Example 24

The preparation is performed in the same manner as in Comparative Example 1, except that the electrolyte further includes J-8 in an amount of 1 wt % and S-1 in an amount of 2 wt % based on the total mass of the electrolyte.

Example 25

The preparation is performed in the same manner as in Comparative Example 1, except that the electrolyte further includes J-8 in an amount of 1 wt % and S-1 in an amount of 5 wt % based on the total mass of the electrolyte.

Example 26

The preparation is performed in the same manner as in Comparative Example 1, except that the electrolyte further includes J-8 in an amount of 1 wt % and S-1 in an amount of 10 wt % based on the total mass of the electrolyte.

Example 27

The preparation is performed in the same manner as in Comparative Example 1, except that the electrolyte contains FEC in a content of 6 wt % and further includes J-3 in an amount of 1 wt %, J-8 in an amount of 1 wt % and S-1 in an amount of 1 wt % based on the total mass of the electrolyte.

Example 28

The preparation is performed in the same manner as in Comparative Example 1, except that the electrolyte contains FEC in a content of 9 wt % and further includes J-3 in an amount of 1 wt %, J-8 in an amount of 1 wt % and S-1 in an amount of 1 wt % based on the total mass of the electrolyte.

Example 29

The preparation is performed in the same manner as in Comparative Example 1, except that the electrolyte contains FEC in a content of 6 wt % and further includes PS in an amount of 3 wt %, J-3 in an amount of 1 wt %, J-8 in an amount of 1 wt % and S-1 in an amount of 1 wt % based on the total mass of the electrolyte.

The types and contents of the additive in Comparative Examples 1 to 16 and Examples 1 to 29 are shown in Table 1 below.

TABLE 1

| No. | FEC (%) | PS (%) | Nitrile (%) J-2 | J-3 | J-6 | J-8 | Silicone compound S-1 | S-2 |
|---|---|---|---|---|---|---|---|---|
| Comparative Example 1 | 3 | | | | | | | |
| Comparative Example 2 | 3 | 1 | | | | | | |
| Comparative Example 3 | 3 | | 1 | | | | | |
| Comparative Example 4 | 3 | | | 1 | | | | |
| Comparative Example 5 | 3 | | | | | 1 | | |
| Comparative Example 6 | 3 | | 1 | | 1 | | | |
| Comparative Example 7 | 3 | | 1 | | | 1 | | |
| Comparative Example 8 | 3 | | | 1 | 1 | | | |
| Comparative Example 9 | 3 | | | 1 | | 1 | | |
| Comparative Example 10 | 3 | | | | | 0.01 | | |
| Comparative Example 11 | 3 | | | | | 35 | | |
| Comparative Example 12 | 3 | | | | | | 1 | |
| Comparative Example 13 | 3 | | | | | | | 1 |
| Comparative Example 14 | 3 | | | | | | 0.01 | |
| Comparative Example 15 | 3 | | | | | | 15 | |
| Comparative Example 16 | | 3 | | | | | 1 | |
| Example 1 | 3 | | 1 | | | | 1 | |
| Example 2 | 3 | | 1 | | | | | 1 |
| Example 3 | 3 | | | 1 | | | 1 | |
| Example 4 | 3 | | | 1 | | | | 1 |
| Example 5 | 3 | | | | 1 | | 1 | |
| Example 6 | 3 | | | | 1 | | | 1 |
| Example 7 | 3 | | | | | 1 | 1 | |
| Example 8 | 3 | | | | | 1 | | 1 |
| Example 9 | 3 | | 1 | | 1 | | 1 | |
| Example 10 | 3 | | 1 | | 1 | | | 1 |
| Example 11 | 3 | | 1 | | | 1 | 1 | |
| Example 12 | 3 | | 1 | | | 1 | | 1 |
| Example 13 | 3 | | | 1 | 1 | | 1 | |
| Example 14 | 3 | | | 1 | 1 | | | 1 |
| Example 15 | 3 | | | 1 | | 1 | 1 | |
| Example 16 | 3 | | | 1 | | 1 | | 1 |
| Example 17 | 3 | | | | | 0.5 | 1 | |
| Example 18 | 3 | | | | | 2 | 1 | |
| Example 19 | 3 | | | | | 5 | 1 | |
| Example 20 | 3 | | | | | 10 | 1 | |
| Example 21 | 3 | | | | | 1 | 0.1 | |
| Example 22 | 3 | | | | | 1 | 0.2 | |
| Example 23 | 3 | | | | | 1 | 0.5 | |
| Example 24 | 3 | | | | | 1 | 2 | |
| Example 25 | 3 | | | | | 1 | 5 | |
| Example 26 | 3 | | | | | 1 | 10 | |
| Example 27 | 6 | | | 1 | | 1 | 1 | 6 |
| Example 28 | 9 | | | 1 | | 1 | 1 | 9 |
| Example 29 | 6 | 3 | | 1 | | 1 | 1 | 6 |

Thereafter, a cycle performance and a high temperature storage performance test for the lithium-ion battery prepared by the above comparative examples and examples are performed:

Cycle Performance Test

The lithium-ion battery is placed in a 25° C. incubator and allowed to stand for 30 minutes to keep the lithium-ion battery at a constant temperature. The battery is charged to 4.4 V with a constant current of 0.7 C and charged to a current of 0.05 C at a constant voltage, and then discharged to 3.0 V with a constant current of 1 C. The above is a charge and discharge cycle. When the capacity for the first discharge is 100%, the charge and discharge cycle is repeated until the discharge capacity is attenuated to 80%, then the test is stopped, and the number of cycles is recorded as an index for evaluating the cycle performance of the lithium-ion battery.

At the same time, the cycle performance at 45° C. of the lithium-ion battery is tested. The test method is the same as the test for the cycle performance at 25° C., but only the temperature is changed to 45° C.

High Temperature Storage Test

The lithium-ion battery is placed in a 25° C. incubator and allowed to stand for 30 minutes to keep the lithium-ion battery at a constant temperature. The battery is charged to 4.4 V with a constant current of 0.5 C and charged to a current of 0.05 C at a constant voltage, and then discharged to 3.0 V with a constant current of 0.5 C. The discharge capacity is recorded as the initial capacity of the lithium-ion battery. Thereafter, the battery is charged to 4.4 V at a constant current of 0.5 C, and charged to a current of 0.05 C at a constant voltage. The thickness of the battery is measured and recorded with a micrometer. The tested lithium-ion battery is transferred to a 60° C. incubator and storage for 21 days, during which the battery thickness is tested and recorded every 3 days. Then after 21 days of storage, the battery is transferred to a 25° C. incubator, allowed to stand for 60 minutes, and discharged to 3.0 V at a constant current of 0.5 C, wherein the discharge capacity is recorded as the remaining capacity of the lithium-ion battery. The storage thickness expansion rate of lithium-ion battery is calculated according to Equation 1 below, and is used as an index for evaluating the high temperature storage gas production amount of the lithium-ion battery.

thickness expansion rate=(thickness after storage for 24 hours−initial thickness)/initial thickness*100%  (Equation 1)

The storage capacity retention rate of lithium-ion battery is calculated according to Equation 2 below, and is used as an index for evaluating the high temperature storage performance of the lithium-ion battery.

capacity retention rate=remaining capacity/initial capacity*100%  (Equation 2)

The test results for the cycle performance and high temperature storage performance of all the examples and comparative examples are shown in Table 2.

TABLE 2

Test results for the cycle performance and high temperature storage performance of the examples and comparative examples

| Groups of tested battery | Cycle Performance | | High Temperature Storage performance | |
|---|---|---|---|---|
| | The number of cycles at 25° C. | The number of cycles at 45° C. | Thickness expansion rate | Capacity retention rate |
| Comparative Example 1 | 681 | 405 | 163% | 78.60% |
| Comparative Example 2 | 693 | 518 | 81% | 81.90% |
| Comparative Example 3 | 692 | 517 | 79% | 82.20% |
| Comparative Example 4 | 696 | 522 | 82% | 82.70% |
| Comparative Example 5 | 698 | 524 | 80% | 81.00% |
| Comparative Example 6 | 695 | 551 | 65% | 80.10% |
| Comparative Example 7 | 702 | 555 | 63% | 80.90% |
| Comparative Example 8 | 704 | 558 | 62% | 80.20% |
| Comparative Example 9 | 706 | 560 | 64% | 80.10% |
| Comparative Example 10 | 682 | 426 | 160% | 78.70% |
| Comparative Example 11 | 501 | 399 | 40% | 80.60% |
| Comparative Example 12 | 724 | 499 | 58% | 82.40% |
| Comparative Example 13 | 726 | 493 | 55% | 82.70% |
| Comparative Example 14 | 683 | 427 | 161% | 78.90% |
| Comparative Example 15 | 542 | 411 | 40% | 82.90% |
| Comparative Example 16 | 723 | 601 | 162% | 76.30% |
| Example 1 | 775 | 636 | 28% | 89.20% |
| Example 2 | 771 | 637 | 25% | 88.90% |
| Example 3 | 779 | 652 | 30% | 89.30% |
| Example 4 | 788 | 650 | 27% | 89.00% |
| Example 5 | 773 | 641 | 28% | 89.40% |
| Example 6 | 779 | 651 | 26% | 89.10% |
| Example 7 | 797 | 661 | 25% | 89.40% |
| Example 8 | 802 | 655 | 26% | 89.50% |
| Example 9 | 818 | 675 | 15% | 90.60% |
| Example 10 | 820 | 679 | 14% | 90.60% |
| Example 11 | 816 | 668 | 16% | 90.50% |
| Example 12 | 823 | 681 | 13% | 90.90% |
| Example 13 | 819 | 676 | 15% | 90.70% |
| Example 14 | 817 | 682 | 14% | 90.50% |
| Example 15 | 833 | 685 | 13% | 90.70% |
| Example 16 | 825 | 679 | 14% | 90.40% |
| Example 17 | 766 | 612 | 50% | 83.90% |
| Example 18 | 792 | 657 | 14% | 90.90% |
| Example 19 | 787 | 648 | 9% | 92.90% |
| Example 20 | 778 | 632 | 5% | 93.40% |
| Example 21 | 789 | 620 | 48% | 84.30% |
| Example 22 | 802 | 623 | 45% | 85.10% |
| Example 23 | 803 | 611 | 37% | 87.40% |
| Example 24 | 810 | 655 | 12% | 91.30% |
| Example 25 | 793 | 610 | 7% | 92.10% |
| Example 26 | 759 | 601 | 4% | 92.50% |
| Example 27 | 837 | 734 | 19% | 89.80% |
| Example 28 | 839 | 725 | 26% | 89.20% |
| Example 29 | 987 | 781 | 12% | 91.70% |

From the data analysis in Tables 1 and 2, and from the data in Comparative Example 1, Comparative Examples 2-9 and Comparative Examples 12-13, it can be seen that the addition of the nitrile compound alone may significantly alleviate the problem of high temperature storage gas production of the lithium-ion secondary battery, and increase the number of cycles of the lithium-ion secondary battery and the capacity retention rate after high-temperature storage; the addition of the siloxane compound alone may also significantly alleviate the problem of high-temperature storage gas generation of the lithium-ion secondary battery, and increase the number of cycles of the lithium-ion secondary battery and the capacity retention rate after high-temperature storage; however when the nitrile compound and the siloxane compound are used alone, the improvement effect on the lithium-ion secondary battery is not obvious.

Examples 1 to 16 show a lithium-ion battery prepared by simultaneously adding a nitrile compound and a siloxane compound with a specific structure into an organic solvent. Comparing Comparative Examples 1 to 9 and Comparative Examples 12-13 with Examples 1 to 16 by the electrical property test results of Table 2, it is known that the simultaneous addition of the nitrile compound and the siloxane compound may further obviously alleviate the problem of high temperature storage gas production of the lithium-ion secondary battery compare with the addition of the nitrile compound or the siloxane compound separately, and reduce the thickness expansion rate of the lithium-ion secondary battery after high-temperature storage while increasing the number of cycles of the lithium-ion secondary battery and the capacity retention rate after high-temperature storage. In Examples 9-16, simultaneous addition of two kinds of nitrile compounds is more effective in improving the number of cycles of the lithium-ion secondary battery and the capacity retention rate after high-temperature storage, it is possibly because the protective film formed on the surface of electrodes by the two nitrile compounds is more stable and is not easily decomposed during charge and discharge. It can be seen from Examples 17 to 20 that the increase in the content of the nitrile compound may further improve the thickness expansion rate of the lithium-ion secondary battery after high temperature storage, and improve the capacity retention rate of the lithium-ion secondary battery after high temperature storage. However, as the content of the nitrile compound increases, the effect of improving the cycle performance of the lithium-ion secondary battery is gradually weakened. When the content of the nitrile compound is too high (Comparative Example 12), the nitrile compound in the electrolyte cannot significantly improve the thickness expansion ratio and the capacity retention rate of the lithium-ion secondary battery after high-temperature storage, but adversely affects the normal-temperature cycle performance and high-temperature cycle performance of the lithium-ion secondary battery.

It can be seen from Examples 21 to 26 that the increase in the content of the siloxane compound may further improve the thickness expansion rate of the lithium-ion secondary battery after high temperature storage, and improve the capacity retention rate of the lithium-ion secondary battery after high temperature storage. However, as the content of the siloxane compound increases, the effect of improving the cycle performance of the lithium-ion secondary battery is gradually weakened. When the content of the siloxane compound is too high, the siloxane compound in the electrolyte cannot significantly improve the thickness expansion ratio and the capacity retention rate of the lithium-ion secondary battery after high-temperature storage, but adversely affects the normal-temperature cycle performance and high-temperature cycle performance of the lithium-ion secondary battery slightly.

It can be seen from Example 29 that when PS is further contained in the electrolyte, the thickness expansion rate and the capacity retention ratio of the lithium-ion secondary battery after high-temperature storage may be more significantly improved, it is possibly because the siloxane compound and PS form a more stable and dense SEI protective film on the surface of the negative electrode.

The present application provides an electrolyte and a secondary battery comprising the same. The electrolyte is prepared by adding an additive with a different content of a siloxane compound and a nitrile compound, and a lithium salt to the electrolyte. By addition of a nitrile compound and a siloxane compound together in a lithium-ion battery electrolyte and a lithium-ion battery, and by fully utilizing the functions of the two, the gas production amount of the lithium-ion battery during high temperature storage may be reduced effectively, the deformation upon high temperature storage of the lithium-ion battery may be significantly improved, thereby further improving the cycle performance and high temperature storage performance of the lithium-ion battery.

The foregoing is only preferred exemplary examples of the present application and is not intended to be limiting of the present application, and any modifications, equivalent substitutions, improvements and the like within the spirit and principles of the present application are intended to be embraced by the protection range of the present application.

What is claimed is:

1. An electrolyte comprising: a nitrile compound and a siloxane compound,
wherein the siloxane compound is selected from one or more of the compounds represented by the following formulas:

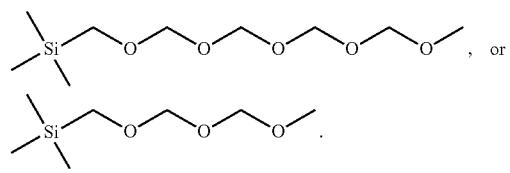, or

.

2. The electrolyte according to claim 1, wherein the mass percentage of the nitrile compound is 0.5 wt % to 10 wt % and the mass percentage of the siloxane compound is 0.1 wt % to 10 wt %, based on the total mass of the electrolyte.

3. The electrolyte according to claim 1, wherein the nitrile compound is selected from one or more of the compounds represented by formula I:

formula I wherein $R_1$, $R_2$ and $R_3$ are independently selected from a group consisting of H, a nitrile group, an alkyl group comprising 1 to 10 carbon atoms, and a halogenated alkyl group comprising 1 to 10 carbon atoms.

4. The electrolyte according to claim 1, wherein the nitrile compound is selected from one or more of the compounds represented by formula II:

$$NC-R_4-\overset{H}{\underset{\underset{CN}{R_6}}{C}}-R_5-CN$$

formula II wherein $R_4$, $R_5$ and $R_6$ are each independently selected from a group consisting of an alkylene group comprising 0 to 5 carbon atoms, a halogenated alkylene group comprising 0 to 5 carbon atoms, an alkyleneoxy group comprising 1 to 5 carbon atoms, a halogenated alkyleneoxy group comprising 1 to 5 carbon atoms, an alkyl alkyleneoxy group comprising 1 to 5 carbon atoms and a haloalkyl alkyleneoxy group comprising 1 to 5 carbon atoms; the number of carbon atoms of $R_4$, $R_5$ and $R_6$ is not 0 at the same time.

5. The electrolyte according to claim 1, wherein the nitrile compound is selected from one or more of the compounds represented by the following formulas:

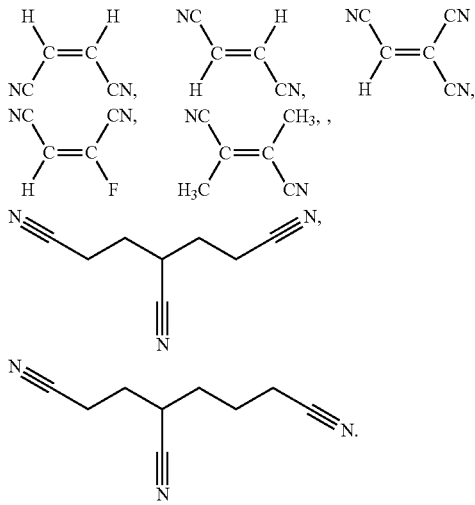

6. The electrolyte according to claim 1, wherein the electrolyte further comprises
an electrolyte salt, wherein the electrolyte salt has a concentration of 0.5 M to 3M.

7. A secondary battery, comprising an electrolyte, wherein the electrolyte comprising: a nitrile compound and a siloxane compound, wherein the siloxane compound is selected from one or more of the compounds represented by the following formulas:

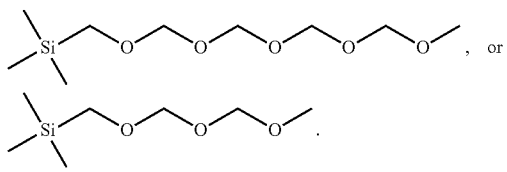

8. The secondary battery according to claim 7, wherein the mass percentage of the nitrile compound is 0.5 wt % to 10 wt % and the mass percentage of the siloxane compound is 0.1 wt % to 10 wt %, based on the total mass of the electrolyte.

9. The secondary battery according to claim 7, wherein the nitrile compound is selected from one or more of the compounds represented by formula I:

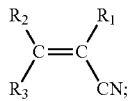

formula I wherein $R_1$, $R_2$ and $R_3$ are independently selected from a group consisting of H, a nitrile group, an alkyl group comprising 1 to 10 carbon atoms, and a halogenated alkyl group comprising 1 to 10 carbon atoms.

10. The secondary battery according to claim 7, wherein the nitrile compound is selected from one or more of the compounds represented by formula II:

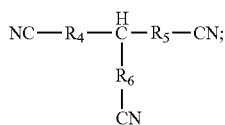

formula II wherein $R_4$, $R_5$ and $R_6$ are each independently selected from a group consisting of an alkylene group comprising 0 to 5 carbon atoms, a halogenated alkylene group comprising 0 to 5 carbon atoms, an alkyleneoxy group comprising 1 to 5 carbon atoms, a halogenated alkyleneoxy group comprising 1 to 5 carbon atoms, an alkyl alkyleneoxy group comprising 1 to 5 carbon atoms and a haloalkyl alkyleneoxy group comprising 1 to 5 carbon atoms; the number of carbon atoms of $R_4$, $R_5$ and $R_6$ is not 0 at the same time.

11. The secondary battery according to claim 7, wherein the nitrile compound is selected from one or more of the compounds represented by the following formulas:

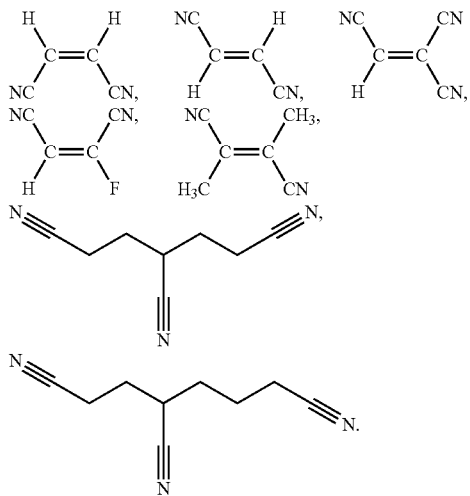

12. The secondary battery according to claim 7, wherein the electrolyte further comprises an electrolyte salt, wherein the electrolyte salt has a concentration of 0.5 M to 3 M.

* * * * *